US009783943B2

(12) United States Patent
Llobet

(10) Patent No.: US 9,783,943 B2
(45) Date of Patent: Oct. 10, 2017

(54) COMBINATION PET LEASH AND WASTE PICKUP DEVICE

(71) Applicant: Montserrat Llobet, Hermosa Beach, CA (US)

(72) Inventor: Montserrat Llobet, Hermosa Beach, CA (US)

( * ) Notice: Subject to any disclaimer, the term of this patent is extended or adjusted under 35 U.S.C. 154(b) by 158 days.

(21) Appl. No.: 14/959,984

(22) Filed: Dec. 4, 2015

(65) Prior Publication Data

US 2017/0159253 A1    Jun. 8, 2017

(51) Int. Cl.
  *E01H 1/00*   (2006.01)
  *E01H 1/12*   (2006.01)
  *A01K 27/00*  (2006.01)

(52) U.S. Cl.
  CPC ......... *E01H 1/1206* (2013.01); *A01K 27/004* (2013.01); *A01K 27/008* (2013.01); *E01H 2001/1273* (2013.01); *E01H 2001/1286* (2013.01)

(58) Field of Classification Search
  CPC .... A01K 27/00; A01K 27/004; A01K 27/008; E01H 1/1206
  See application file for complete search history.

(56) References Cited

U.S. PATENT DOCUMENTS

| 7,063,365 | B1 | 6/2006 | Chase |
| 7,374,215 | B2 | 5/2008 | Anderson |
| 7,523,972 | B1 | 4/2009 | Wawrzynowski |
| 8,100,445 | B1 | 1/2012 | Brar |
| 8,256,384 | B2 | 9/2012 | Wheeler et al. |
| 8,925,495 | B1 | 1/2015 | Lee |
| 2006/0207522 | A1 | 9/2006 | Perkitny |
| 2011/0193359 | A1 | 8/2011 | Howard |
| 2013/0000566 | A1* | 1/2013 | Berton ................ A01K 27/004 119/796 |
| 2014/0131377 | A1* | 5/2014 | Rogers ................ A01K 27/008 221/155 |
| 2015/0196010 | A1* | 7/2015 | Orubor ................ A01K 27/004 119/72 |
| 2016/0219838 | A1* | 8/2016 | Flaig ................... A01K 27/004 |

FOREIGN PATENT DOCUMENTS

CA    2763728 A1 * 12/2010 ........... A01K 27/004

* cited by examiner

*Primary Examiner* — Monica Williams
*Assistant Examiner* — Aaron Rodziwicz
(74) *Attorney, Agent, or Firm* — Klein, O'Neill & Singh, LLP

(57) ABSTRACT

A combination pet leash and sanitary solid pet waste pickup device has a body with an upper housing having a carrying handle, a lever rotatably held in a guide and a retractable leash mechanism mounted therein. The pet leash extends outwardly through an opening in the upper housing. A pickup mechanism containing a flexible containing element is held by mechanical elements secured in an open lower housing. An open plastic bag is inserted and held within the flexible containing element and a pair of flexible lines is connected between the lever and the pickup mechanism so that moving the lever to a closed position closes the flexible containing element and the plastic bag to pick up solid pet waste. In the closed position a user may carry the device and dispose of the plastic bag and solid pet waste, when desired, by moving the lever to the open position.

16 Claims, 7 Drawing Sheets

COMBINATION PET LEASH AND WASTE PICKUP DEVICE

BACKGROUND OF THE INVENTION

1. Field of the Invention

This invention generally relates to pet products and, more particularly, to a combination pet leash and sanitary solid pet waste pickup device.

2. Description of the Prior Art

Many types of pet leashes, solid pet waste pickup devices and combination pet leashes and solid pet waste pickup devices are known. For example, the following listed U.S. patents and published applications illustrate a number of different such devices: U.S. Pat. Nos. 8,925,495, 8,256,384, 8,100,445, 7,523,972, 7,374,215, 7,063,365, 2011/0193359 and 2006/0207522.

While the foregoing prior art devices allow for different devices and methods of picking up solid pet waste, with or without combined leashes, they tend to be very complicated to make and use and have a large number of moving parts with complicated operating mechanisms, or have other disadvantages when trying to use. These known devices, as well as other older and harder to use devices, do not offer the advantages of the device of the present invention, which is believed to be smaller and more streamlined and both simpler to use and to make. The device of the present invention has fewer and simpler moving parts, thereby allowing it to be easier and cheaper to manufacture (the cost should be about the same as a regular retractable dog leash alone.), Furthermore, the device of the present invention provides similar or improved results over known devices or systems.

The improved device of the present invention provides a combination pet leash and sanitary solid pet waste pickup device that overcomes many of the problems with known devices. Additionally, almost any suitably sized available plastic or other artificial sanitary-type bag for picking up, holding and disposing of solid pet waste may be used with and both held within and ejected from an open lower portion of the device. An innovative mechanism having a flexible containing or holding element is held by flexible mechanical elements of fingers secured in the open lower portion. The flexible mechanical elements and the flexible containing element are pulled together and released by a flexible cable or line similar to the manner in which a drawstring bag is opened and closed. The flexible cable is connected to and operated by a simple lever mechanism extending from an opening in an upper housing portion. The upper housing portion is preferably hollow and includes a carrying handle and a retractable leash mechanism mounted therein, in any desired manner, such as on an interior surface of the lower portion. The leash extends through an opening in the upper housing portion and may be held in position by a brake or the like in the carrying handle. This unique construction allows for a more compact and easily used device that is less burdensome to carry and use.

Therefore, there exists a need in the art for a less, cumbersome, easy-to-carry and use, combination pet leash and sanitary solid pet waste pickup device that overcomes known problems in a simpler and less costly manner.

SUMMARY OF THE INVENTION

The improved pet leash and sanitary solid pet waste pickup device of the present invention provides many advantages including, but not limited to the following:

1) Easy loading of a replacement debris bag, such as a plastic bag, in an open lower portion thereby eliminating any requirement for removal of a cover of any type. This easy loading of a replacement debris bag makes it more likely than not that a person will utilize the device of the present invention when walking or exercising a pet.

2) The device of the present invention provides a contoured body that is more easily carried and which is operated more easily and efficiently because it has fewer and simpler moving parts. This saves on both materials and energy.

3) Operation of a lever closing and opening mechanism is preferably guided by an opening, such as a slot or the like, in the upper housing portion, adjacent the carrying handle for a streamlined look and easy accessibility.

4) The device of the present invention may be used to carry the debris bag with the solid pet waste within the bag in a single hand while walking a pet held by the leash until a trashcan or other area to sanitarily throw the waste away is reached.

Accordingly, it is a general object of the present invention to provide an improved combination pet leash and sanitary solid pet waste pickup assembly. It is a more particular object of the present invention to provide a combination pet leash and sanitary solid pet waste pickup system that minimizes the number of parts used in assembly. It is yet another object of the present invention to provide a combination pet leash and sanitary solid pet waste pickup device that is easily carried and used. It is a further object of the present invention to provide an improved combination pet leash and sanitary solid pet waste pickup device that substantially hides a debris bag in an inner open housing portion when carrying the device before the bag and solid waste are safely and sanitarily thrown away without the user of the device having to touch the bag and contained waste. It is a still further object of the present invention to provide a novel combination pet leash and sanitary solid pet waste pickup device that has an integrated design that is more aesthetically pleasing and that allows a person to easily carrying and use the device.

In accordance with one aspect of the present invention there is provided, a combination pet leash and sanitary solid pet waste pickup device that may be used with any available properly sized debris bag without the need of special bags or holding compartments for such bags or other utensils.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
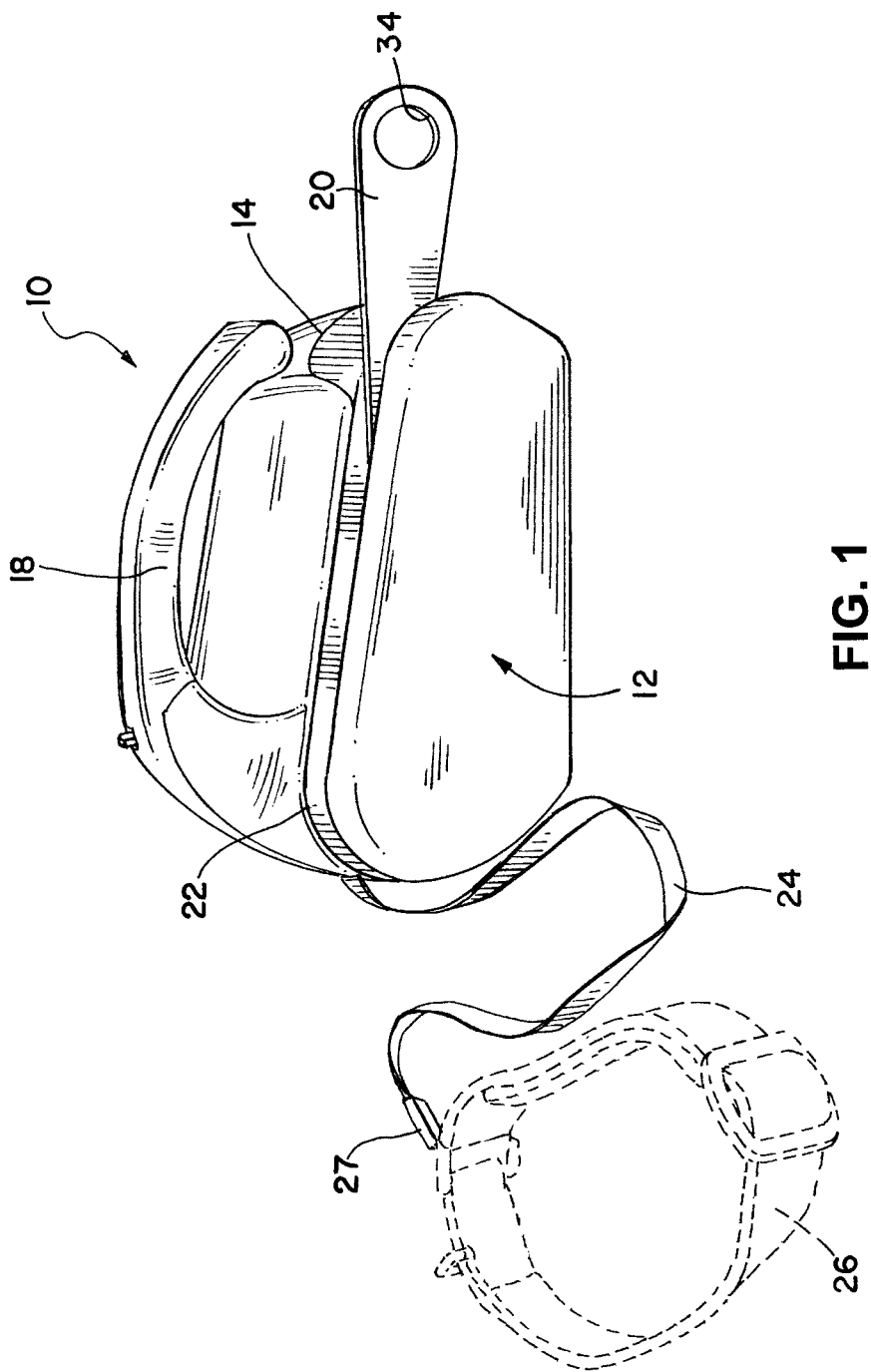
FIG. 1 is a perspective view of a combination pet leash and sanitary solid pet waste pickup device of the present invention showing a lever operating handle in a closed position and a pet collar in broken line attached to an outer end of the leash.
Figure 2:
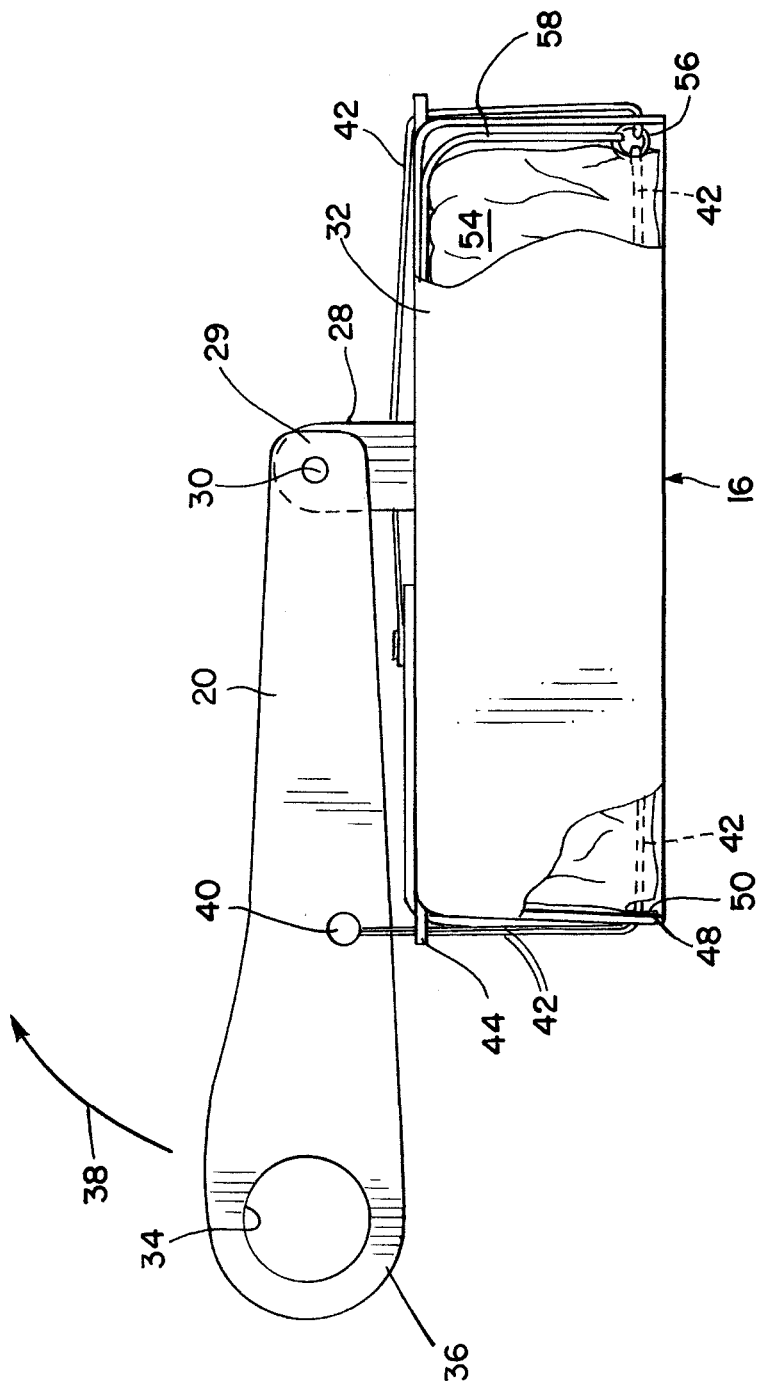
FIG. 2 is a side elevational view of a partial inner or lower portion, removed from the upper hollow portion of the body of the combination pet leash and sanitary solid pet waste pickup device of FIG. 1, with sections of opposite end areas broken away to show an open cavity with a collapsible holding member therein, and with the lever operating handle in the open position.
Figure 3:
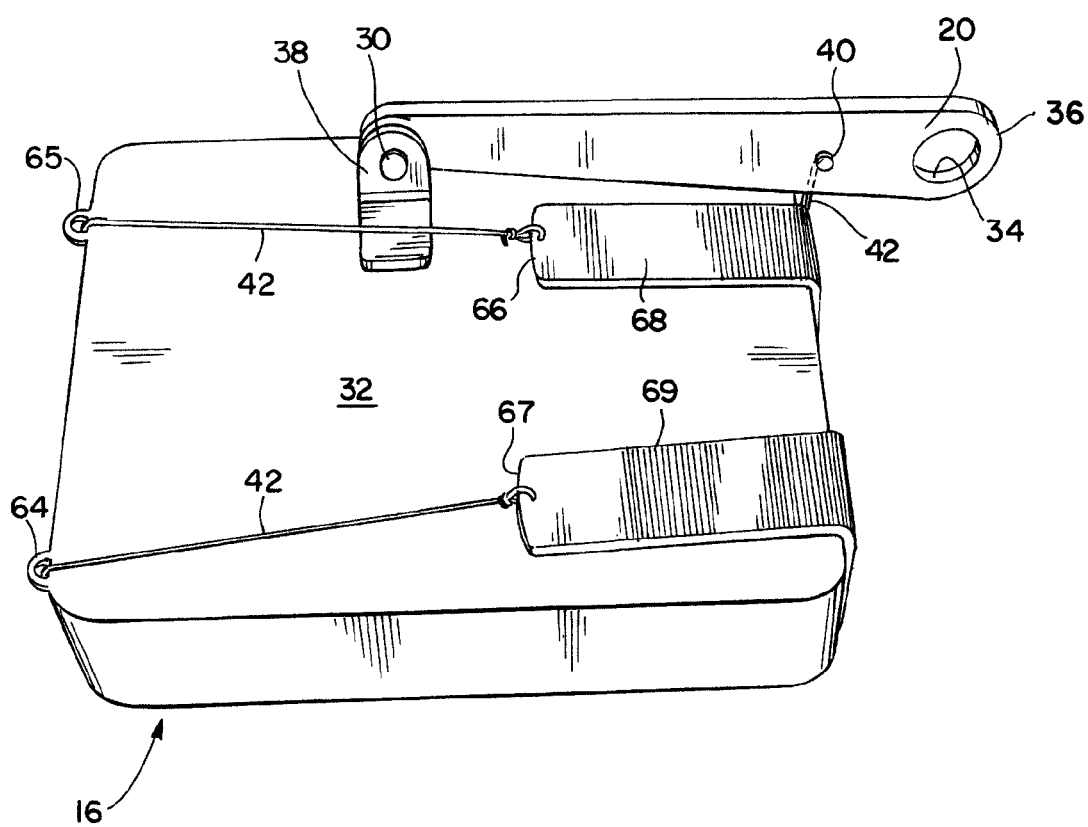
FIG. 3 is a top perspective view, of FIG. 2.

The following description is provided to enable any person skilled in the art to make and use the invention and sets forth the best modes contemplated by the inventor of carrying out their invention. Various modifications, however, will remain readily apparent to those skilled in the art, since the generic principles of the present invention have been defined herein specifically to provide for an improved combination pet leash and sanitary solid pet waste pickup assembly.

The combination pet leash and sanitary solid pet waste pickup assembly, device or system of the present invention is used both to walk a pet and to sanitarily pick up any solid waste the pet may leave, by inserting a plastic bag, or the like, over the edges of and into a collapsible holding member mounted in an open lower cavity, where the bag is held in the open position. With the bag in position, the device is moved so that the open bag and collapsible holding member are over and covering the solid waste and then actuating a lever in the top portion of the assembly to close the collapsible holding member and the plastic bag. The plastic bag is then tied off or closed and thrown away, when convenient, by moving the operating lever to open the collapsible holding member.

Turning now to the drawings, the figures illustrate a combination pet leash and sanitary solid pet waste pickup assembly, device or system 10 having a body 12. The body 12 includes a top or upper portion 14 and an inner or lower portion 16 (shown in FIGS. 2-9). The inner or lower portion 16 is preferably releasably secured inside of the upper portion 14, in any known manner, as by means of screws or the like (not shown).

The top portion 14 is preferably substantially hollow and made from a metal or plastic and includes a carrying handle 18 formed so as to fit comfortably in substantially any hand and an actuation or operating handle 20, preferably in the form of a lever, guided in an open slot 22, formed on one side of the top portion. A leash 24 extends outwardly through an opening 25 (see FIG. 9) in the top portion and is connected at its outer end 27 to a collar or similar pet holding means, shown in broken line at 26. The inner end of the leash is attached to a retractable mechanism mounted in the device, described more fully below.

It is to be understood that the combination pet leash and sanitary solid pet waste pickup assembly or device 10 of the present invention may take any number of different configurations, depending on the aesthetic look desired, but that it is preferably small and compact so as to be easily, manufactured, carried and used.

Turning now to FIGS. 2-7, there shown is the inner or lower portion 16, broken away from or released from inside of the top portion 14. The actuation or operating handle 20 is shown as being rotatably mounted on a bracket or other securing element 28 by means of a hinge element or pin 30 at a first or inner end 29. The bracket 28 is secured to a top surface 32 of an open cavity 50 formed in the lower portion, described more fully below. The actuation or operating handle or lever 20 may include one or more openings 34, for a finger or the like, at an outer end 36 to enable the lever to be moved from the open position shown in FIG. 2, in the direction of the arrow 38, to the closed position, shown in FIG. 1.

The actuation or operating handle or lever 20 also preferably includes a securing pin or other type securing element 40 between the ends thereof. An actuation mechanism or system, such as a single split or a pair of flexible elongated cables, elements or lines 42 having a central portion or one end of each of the pair of lines secured in, around or to the securing element 40 (hereinafter referred to as a pair of lines 42). The pair of lines 42 then extend from the securing element 40 through a guide element 44 and are fed through an opening 46 (see FIG. 7) at a first end surface 48 of the lower portion 16.

Figure 4:
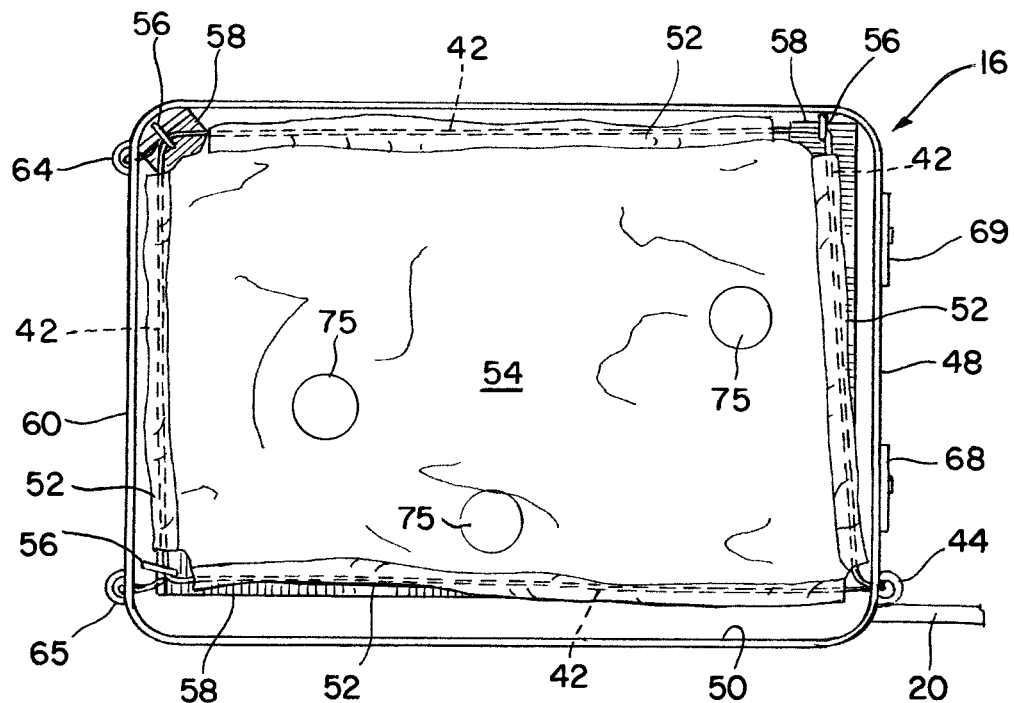
FIG. 4 is a bottom plan view of FIG. 2 showing the open cavity with the collapsible holding member held in an open position, where a plastic bag or other debris bag may be inserted and held for picking up and capturing solid pet waste when the lever operating handle is moved from the open position shown, to a closed position.
Figure 5:
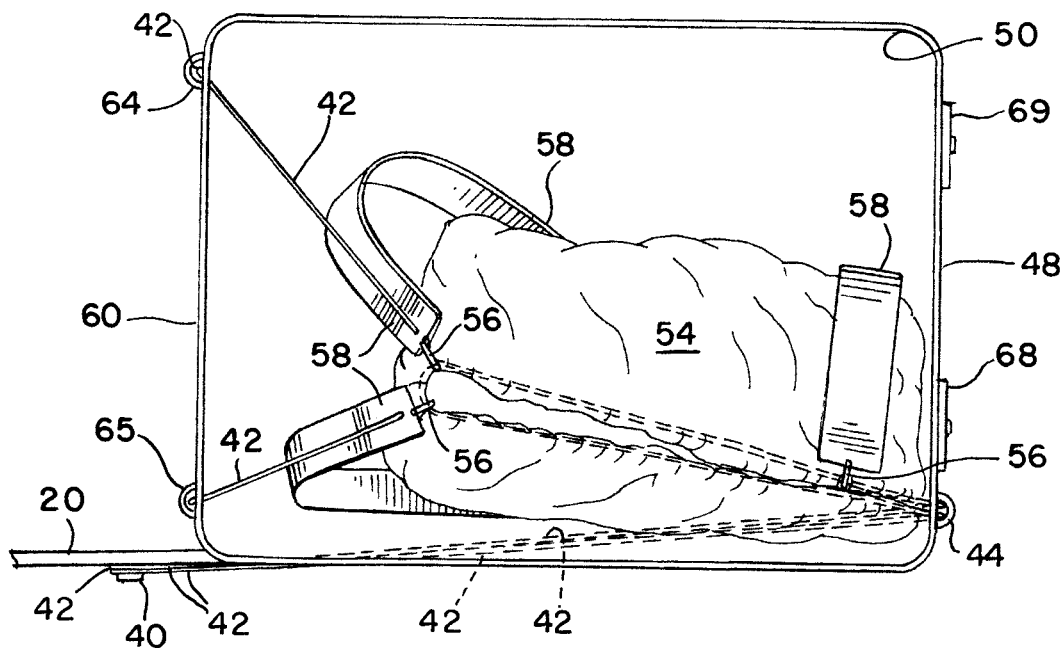
FIG. 5 is a further bottom plan view of FIG. 2 showing the operating handle moved to the closed position to close the top of the collapsible holding member and move flexible fingers over the collapsible holding member and any bag held therein, after solid pet waste is picked up, so as to capture the solid pet waste and the bag in the device.
Figure 6:
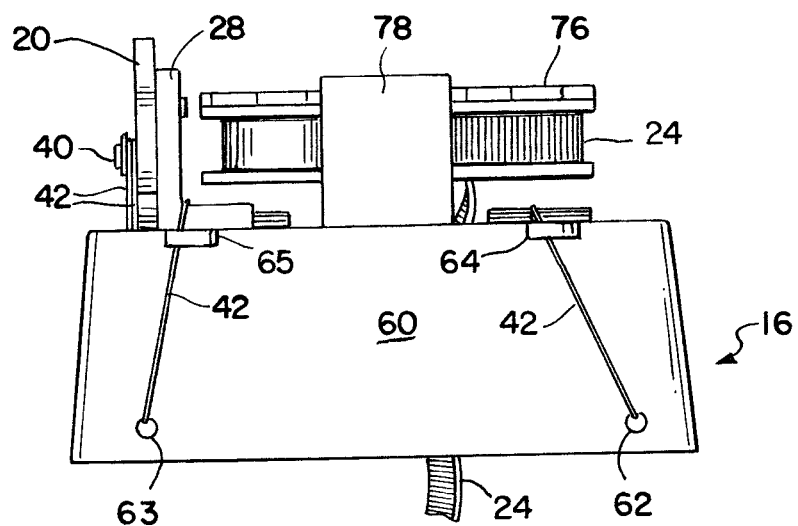
FIGS. 6 and 7 are opposite end views of the complete lower portion, removed from the upper hollow portion of the body, including a retractable leash assembly mounted on the top thereof.
Figure 7:
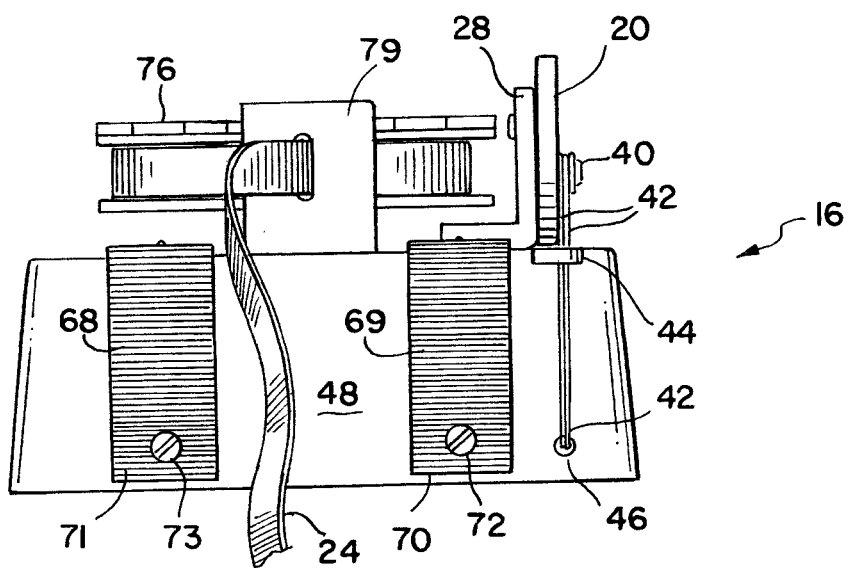

As shown in FIGS. 3-7 the pair of lines 42 pass through the opening 46 into a cavity 50 formed in the lower portion 16 where each of the pair is threaded through open casings or looped outer edges 52 of a collapsible holding member 54. As is best shown in FIGS. 4 and 5, the pair of flexible lines 42 is first threaded through different open casings along the outer edges 52 until they reach the outer edge 52 adjacent the end wall 60 where they are both threaded in the same open casing from opposite directions.

The collapsible holding member 54 is held in place within the cavity 50 by the pair of lines 42 passing through the different open casings 52 and openings, securing elements or rings 56 formed or held in upper portions of a plurality of flexible fingers 58 secured in the cavity in any desired manner (not shown). The pair of lines 42 exit the open casing 52 adjacent the end wall 60 and are then fed through separate openings 62, 63 in the end wall 60, and are fed upwardly through guides 64, 65 over the top surface 32 where they are secured in any desired manner, such as by rings or the like, to first or outer ends 66, 67 of a pair of bands or elements 68, 69 resting on the top surface 32 (see FIG. 3) and extending over an upper end of end wall 48. The elements 68, 69 are secured at second or inner ends 70, 71 to the end wall 48 by means of securing elements 72, 73, such as screws or the like.

It is to be understood that the retractable leash 24 operates in a known manner. That is, a holding element 27 at the outer end of the leash is attached to the collar 26 of a pet. The other or inner end of the leash 24 is secured to a retractable device 76 shown mounted on the top surface 32 of the inner or lower portion 16 between brackets 78, 79 (see FIGS. 6 and 7)

A pet animal is walked or exercised with the leash and collar attached, in a known manner. However, if the pet then has to do its business and deposits solid pet waste, on any type of surface, the solid pet waste may then be picked up by the device 10 of the present invention as described herein.

Figure 9:
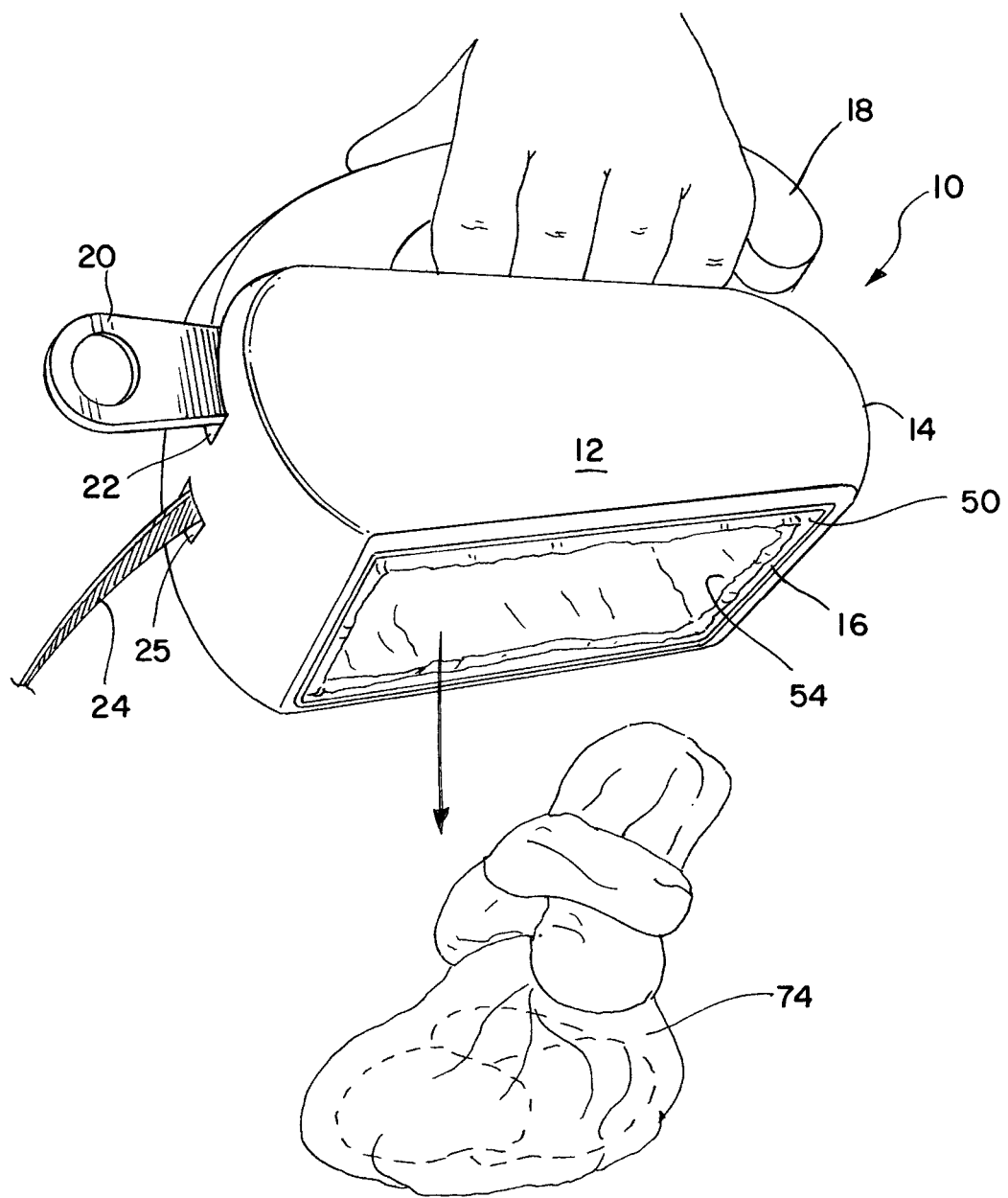
FIG. 9 is a perspective bottom view of the combination pet leash and sanitary solid pet waste pickup system, held in the hand of a user with the lever operating system moved to the open position to allow the plastic bag, having the solid pet waste therein, tied off or closed and released from the open collapsible holding member in the open cavity for disposal into a trash container.

If not already in the collapsible holding member 54, a bag 74, such as a plastic bag, is inserted and held in place in the open lower cavity 50. Any desired means, such as reusable pads 75 (see FIG. 4) are adhered to the interior surface of the open collapsible holding member 54. These pads may be a Polyurethane Gel or other releasable and reusable adhesive material to which a plastic bag may be secured in the open cavity. Then, after any solid pet waste is picked up, the device 10 and the closed bag 74 are carried until it is deemed feasible to throw away the bag, by opening the operating lever 20 over a trash container, whereby the weight of the bag and its contents are released from the pads 75 and open collapsible holding member 54, as shown in FIG. 9.

Figure 8:
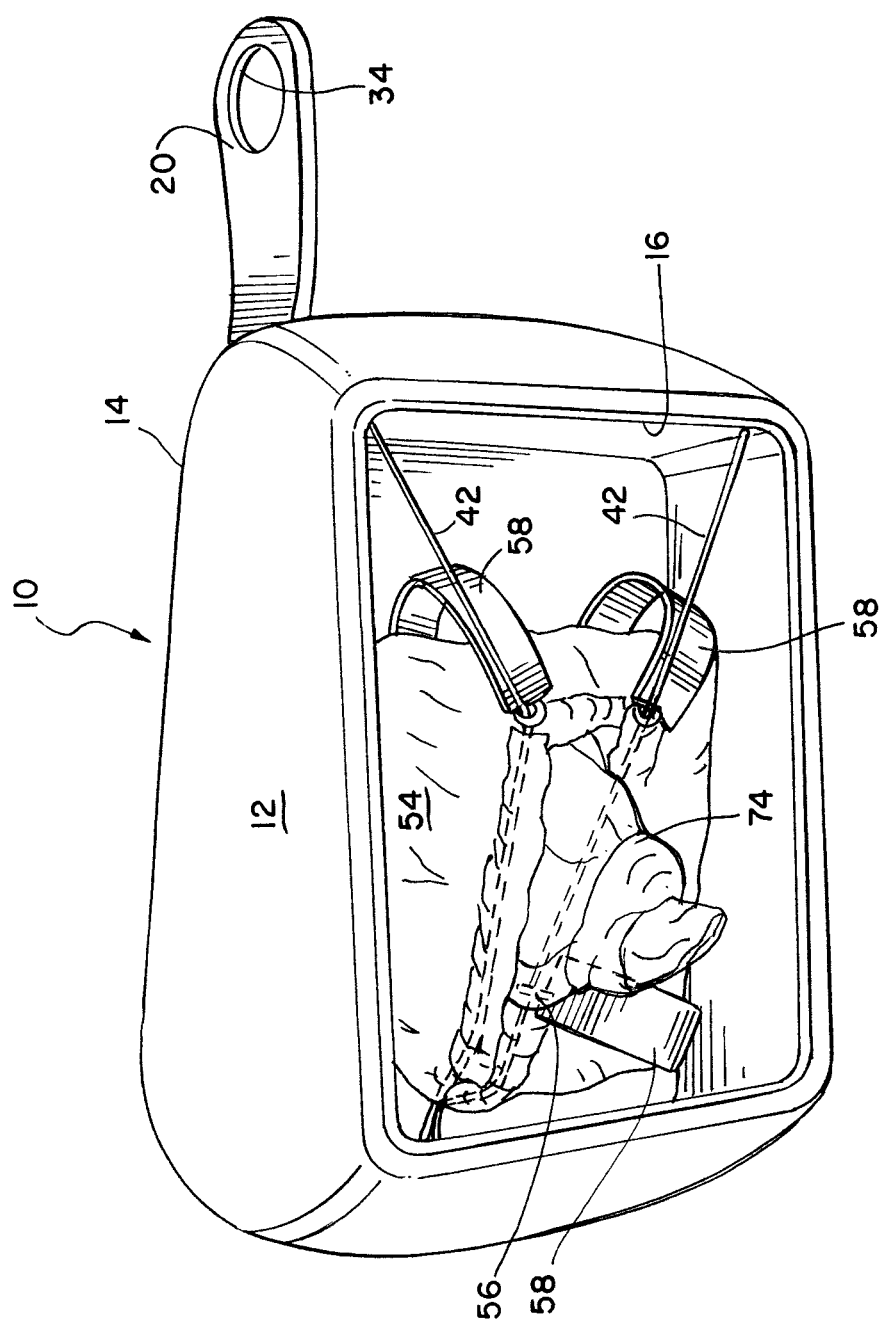
FIG. 8 is a bottom perspective view of the combination pet leash and sanitary solid pet waste pickup system shown in FIG. 1 with the collapsible holding member in the closed position in an open cavity in the lower portion and the flexible fingers bent or flexed to aid in holding and capturing a plastic bag and solid pet waste in the device.

Normally a user of the device 10 would have a bag 74 inserted in and held in the open collapsible holding member 54 when walking a pet. The bag 74 is held in place, as explained above, and the excess or overhanging edges, if any, tucked in over the open casings 52, where they are held by friction. The device 10 is then placed so that the open bag is over and covering the solid pet waste and the lever 20 actuated or moved in the slot 22 from the open position shown in FIGS. 2, 4 and 9 to the closed position shown in FIGS. 1, 5 and 8. This movement pulls the pair of lines 42, against the resistance of the flexible elements 68, 69 so as to move the flexible fingers 56 while at the same time being pulled through and tightening the casings 52, to close the open top of the collapsible holding element 54 and capturing the bag 74 and solid pet waste therein. Any part of the bag 74 protruding from the closed top of the collapsible holding element 54 is then closed or tied off, as shown in FIGS. 8 and 9.

It, therefore, can be seen that the present invention provides an improved less cumbersome, easy-to-use combination pet leash and sanitary solid pet waste pickup assembly or device having an integrated design, with a single housing comprised of a number of integrated components that may be easily manipulated, and which may be used to walk a pet and pick up any solid waste the pet may leave on substantially any surface by inserting a disposable debris bag in a lower portion of the device.

Those skilled in the art will appreciate that various adaptations and modifications of the just-described preferred embodiment may be configured without departing from the scope and spirit of the invention. Therefore, it is to be understood that, within the scope of the appended claims, the invention may be practiced other than is specifically described herein.

What is claimed is:

1. A combination pet leash and sanitary solid pet waste pickup device, comprising;
    a housing having an upper portion and a lower portion;
    the upper portion having a carrying handle, an operating handle and a retractable pet leash held therein and extending out of the upper portion;
    the lower portion is held in the upper portion and has a pickup mechanism with a flexible containing element having a plurality of mechanical elements, and adapted to hold a debris bag, secured in an open cavity in the lower portion;
    the pickup mechanism being actuated by a pair of flexible lines secured between the pickup mechanism and the operating handle extending from an opening formed in the upper portion; and
    the operating handle, when moved between open and closed positions moving the pair of flexible lines to actuate the flexible containing element, between opened and closed positions so as to pick up, hold and dispose of solid pet waste.

2. The combination pet leash and sanitary solid pet waste pickup device of claim 1, further including a removable debris bag inserted and held in the flexible containing element.

3. The combination pet leash and sanitary solid pet waste pickup device of claim 2, wherein the operating handle is a lever rotatably mounted in the device and the upper portion includes a guide slot formed therein to guide movement of the lever.

4. The combination pet leash and sanitary solid pet waste pickup device of claim 3, wherein the pair of flexible lines is secured between the lever and upper edges of the flexible containing element.

5. The combination pet leash and sanitary solid pet waste pickup device of claim 4, wherein the pair of flexible lines have first end portions secured to a securing element on the lever; and wherein the pair of lines are then fed through an opening in a wall of the cavity in the lower portion and threaded into open casings formed on outer edges of the collapsible holding member to hold the collapsible holding member in place within the cavity.

6. The combination pet leash and sanitary solid pet waste pickup device of claim 5, wherein the pair of flexible line pass through different open casings and through different holding elements secured to upper portions of a plurality of flexible fingers secured in the cavity by lower portions; the pair of flexible lines upon exiting the open casings and holding element each being fed through a different opening in an opposite end wall of the cavity and through a different guide until a second end of each of the pair of lines is secured to an outer end of a pair of flexible bands secured on an outer wall of the cavity.

7. A combination pet leash and sanitary solid pet waste pickup device, comprising;
    a housing having a body with a top portion and an inner lower portion;
    the top portion being substantially hollow and having a carrying handle fixed to and exterior surface;
    an operating handle movably mounted in the housing and a retractable pet leash held within the body;
    the inner lower portion being releasably held in the top portion and having a pickup mechanism with a flexible containing element having a plurality of mechanical elements secured in an open cavity in the inner lower portion; the flexible containing element adapted to hold a debris bag,
    the pickup mechanism being actuated by flexible lines secured between the pickup mechanism and the operating handle; and
    the operating handle extending from an opening formed in the top portion and being moveable between open and closed positions to move the flexible lines so as to operate the flexible containing element, between closed and opened positions, so as to pick up, hold and dispose of solid pet waste.

8. The combination pet leash and sanitary solid pet waste pickup device of claim 7, further including a removable plastic bag inserted and held in the flexible containing element.

9. The combination pet leash and sanitary solid pet waste pickup device of claim 7, wherein the operating handle is a lever and the top portion includes a guide slot formed therein to guide movement of the lever.

10. The combination pet leash and sanitary solid pet waste pickup device of claim 7, wherein the pair of flexible lines are secured between the lever and upper edges of the flexible containing element.

11. The combination pet leash and sanitary solid pet waste pickup device of claim 10, wherein the pair of flexible lines have first end portions held to a securing element on the lever; and wherein the pair of flexible lines are fed through an opening in a wall of the open cavity in the lower portion and threaded into open casings formed on outer edges of the collapsible holding member before being fed through openings in an opposite wall of the open cavity and secured to bands held on an outer surface of the open cavity to hold the collapsible holding member in place.

12. A combination pet leash and sanitary solid pet waste pickup device, comprising;
- a housing having a body with a top portion and a lower portion;
- the top portion being substantially hollow and having a carrying handle fixed to and exterior surface and an operating lever movably mounted in a guide slot in the top portion;
- a retractable pet leash held within the body;
- the lower portion being releasably held in the top portion by mechanical securing elements and including a pickup mechanism with a flexible containing element having a plurality of mechanical elements secured in an open cavity; the flexible containing element adapted to releasably hold an open debris bag therein by means of a plurality of adhesive elements;
- the pickup mechanism being actuated by flexible lines secured between the pickup mechanism and the operating lever; and
- the operating lever being moveable between open and closed positions to move the flexible lines so as to open and close the flexible containing element and any debris bag therein, to pick up, hold and dispose of solid pet waste.

13. The combination pet leash and sanitary solid pet waste pickup device of claim 12, further including a removable plastic bag inserted and held in the flexible containing element.

14. The combination pet leash and sanitary solid pet waste pickup device of claim 12, wherein the pair of flexible lines are secured between the lever and open casings formed on the upper edges of the flexible containing element.

15. The combination pet leash and sanitary solid pet waste pickup device of claim 14, wherein the pair of flexible lines are held to a securing element on the lever; and wherein the pair of flexible lines are fed through an opening in a first end wall of the cavity in the lower portion and threaded into the open casings of the collapsible holding member before being fed through openings in a second opposite end wall of the cavity where they are fed around an outer wall of the open cavity and secured to bands held on the outer wall of the cavity to hold the collapsible holding member in place within the open cavity.

16. The combination pet leash and sanitary solid pet waste pickup device of claim 15, wherein the pair of flexible line pass through different open casings and through different holding elements secured to upper portions of a plurality of flexible fingers secured in the cavity by lower portions.

\* \* \* \* \*